US009881715B2

(12) United States Patent
Pederson et al.

(10) Patent No.: US 9,881,715 B2
(45) Date of Patent: Jan. 30, 2018

(54) HEATED EXTENSION CORD

(71) Applicants: Trent Jason Pederson, Medicine Hat (CA); Trent Norman Krell, Redcliff (CA); Chad Anthony Goldade, Redcliff (CA)

(72) Inventors: Trent Jason Pederson, Medicine Hat (CA); Trent Norman Krell, Redcliff (CA); Chad Anthony Goldade, Redcliff (CA)

( * ) Notice: Subject to any disclaimer, the term of this patent is extended or adjusted under 35 U.S.C. 154(b) by 489 days.

(21) Appl. No.: 14/464,770

(22) Filed: Aug. 21, 2014

(65) Prior Publication Data

US 2016/0055941 A1    Feb. 25, 2016

(51) Int. Cl.
*H05B 3/58*     (2006.01)
*H01B 7/28*     (2006.01)
*H05B 3/56*     (2006.01)

(52) U.S. Cl.
CPC ............ *H01B 7/28* (2013.01); *H05B 3/56* (2013.01)

(58) Field of Classification Search
CPC .......... H01B 7/02; H01B 7/2254; H01B 7/28; H01B 7/0054; H01B 7/292; H05B 3/56; H05B 3/54; Y10T 29/49083
See application file for complete search history.

(56) References Cited

U.S. PATENT DOCUMENTS

| | | | |
|---|---|---|---|
| 3,045,102 A | 7/1962 | Fessenden | |
| 4,531,049 A | 7/1985 | Sato | |
| 8,212,191 B2 | 7/2012 | Sopory et al. | |
| 2009/0283514 A1 | 11/2009 | Mech et al. | |
| 2011/0284520 A1* | 11/2011 | Fong | H05B 1/0272 219/494 |
| 2012/0037611 A1 | 2/2012 | Karlsen et al. | |
| 2013/0062097 A1 | 3/2013 | Hammond et al. | |

FOREIGN PATENT DOCUMENTS

| | | |
|---|---|---|
| CA | 2174615 | 10/1997 |
| CA | 2260189 | 1/1998 |
| CA | 2359293 A1 | 4/2002 |
| CA | 2469775 A1 | 5/2004 |
| CA | 2724561 A1 | 11/2009 |
| CA | 2779682 A1 | 5/2011 |

* cited by examiner

*Primary Examiner* — Shawntina Fuqua
(74) *Attorney, Agent, or Firm* — Richard D. Okimaw

(57) ABSTRACT

The present invention relates to a cord structured to connect a power source to a power take-off. The cord comprises a conductor extending along a length of the cord between opposite ends thereof, an insulator secured in surrounding relation to the conductor and extending along a length thereof, at least one resistance wire connected to the insulator and extending along at least a majority of a length of the insulator, a switching structure connected to the resistance wire and structured to define an active connection of the resistance wire in current receiving relation to the power source, and a temperature sensor structured to sense temperature exteriorly of the insulator. The temperature sensor is connected to the switching structure and is operative therewith to establish the active connection on determination of a predetermined ambient temperature. The resistance wire heats the insulator upon establishment of the active connection.

18 Claims, 4 Drawing Sheets

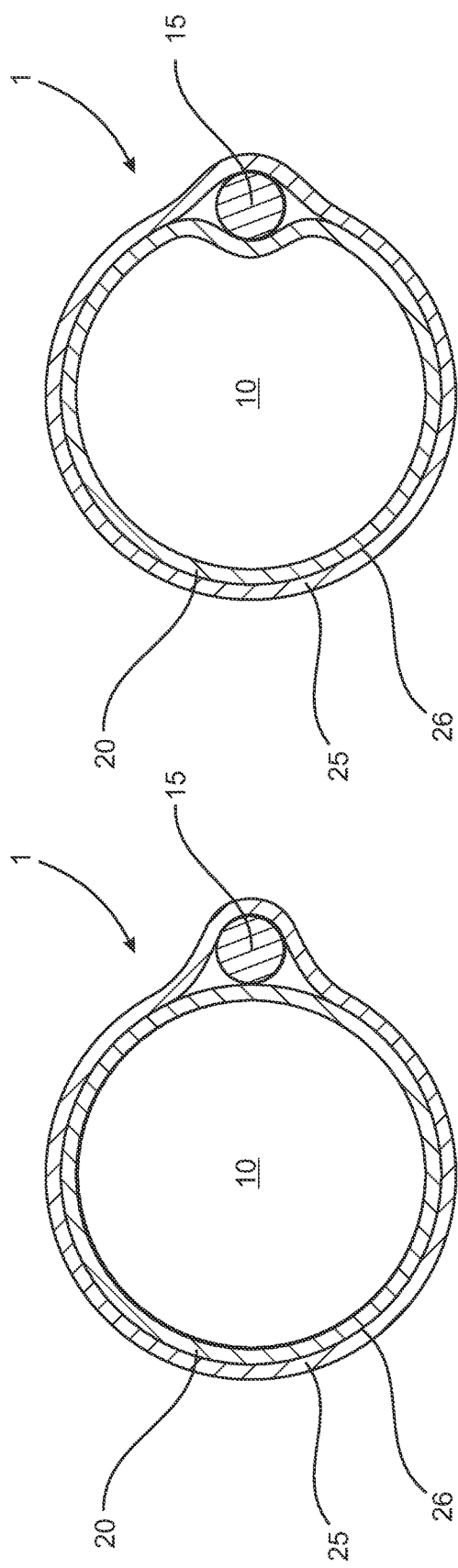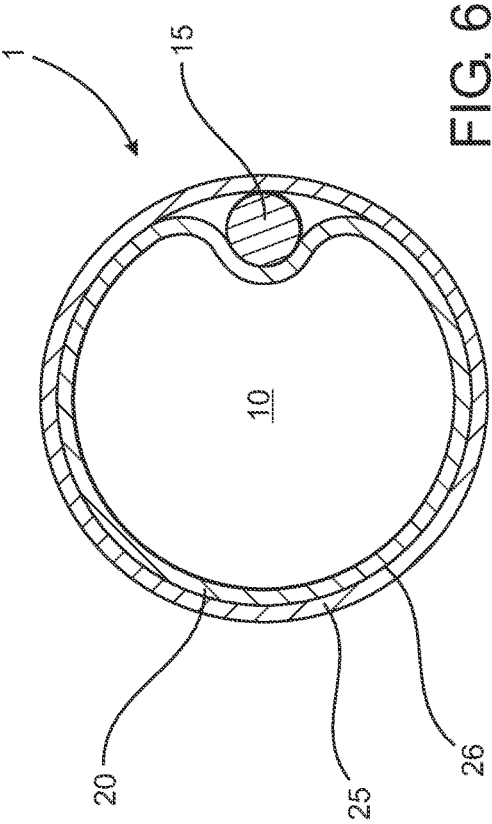

HEATED EXTENSION CORD

BACKGROUND OF THE INVENTION

Field of the Invention

The present invention provides for an extension cord for transfer of electrical power from a power source to a power take-off. More specifically, an extension cord in accordance with the present invention includes a resistance wire disposed and structured to transfer heat to a primary insulator disposed about a primary conductor.

Description of the Related Art

Use of extension cords poses a challenge when operating in cold-weather environments. For example, electrical equipment that is operated outdoors, such as construction equipment, yard equipment, external lighting, etc., is necessarily exposed to ambient conditions. In cold climates, those conditions may jeopardize the equipment and the extension cords that form the connection between the equipment and a power source. This may further be exacerbated as temperatures drop overnight and/or the equipment is shut off or allowed to go unused for a period of time. As a result to exposure to harsh, cold temperatures, the reliability of the extension cord may be decreased. Further, handling cold or frozen cords is difficult. For example, frozen cords become stiff and hard to maneuver. The cords are thus difficult to coil or uncoil for deployment or storage purposes, requiring that they be first be thawed lest one be prepared for a struggle.

Accordingly, what is needed in the art is an extension cord that comprises a heating mechanism structured to sufficiently heat the extension cord so as to reduce the effects brought about by cold climate. Further, it would be of benefit if such an extension cord were further structured for determination of a predetermined ambient temperature, such that upon its determination the extension cord would self-activate and provide heat to itself.

SUMMARY OF THE INVENTION

It is accordingly an object of the present invention to provide such an extension cord. In an illustrative embodiment of the present invention, the extension cord is structured to connect an electrical power source to a power take-off. As will be further illustrated herein, various embodiments of an extension cord are operative so as to activate upon determination of a predetermined temperature, such as a cold ambient temperature. Such activation causes the extension cord to heat itself, addressing the problems associated with traditional cables that may become cold or frozen, such as stiffening to a point of lack of maneuverability or handling.

Therefore, a preferred embodiment of an extension cord comprises a primary conductor extending along a length of the extension cord between opposite ends thereof. Further, the extension cord comprises a primary insulator secured in surrounding relation to the primary conductor and extends along a length thereof. At least one elongated resistance wire is connected to the primary insulator and extends along at least a majority of a length of the primary insulator.

The extension cord further comprises a switching structure connected to the resistance wire. The switching structure is structured to define an active connection of the resistance wire in current receiving relation to the power source.

Additionally, a temperature sensor is disposed and structured to sense ambient temperature exteriorly of the primary insulator. The temperature sensor and switching structure are connected to one another and operate together to establish the active connection upon determination of a predetermined ambient temperature, such as but not limited to the temperature decreasing below a desired temperature threshold. In a preferred embodiment, the temperature sensor and switching structure are cooperatively structured to collectively define a thermostat. Examples of thermostats include those facilitating "self-regulation," i.e. configured to engage and disengage current without intervention from e.g. a user. By way of example, a self-regulated thermostat may include a bimetal thermostat. By way of example, a self-regulated, one contemplated embodiment of a thermostat comprises a first conducting surface and a second conducting surface disposed in spaced relation to one another. The first conducting surface is structured to deform according to changes in temperature and, upon reaching a predetermined temperature, such deformation causes the first conducting surface to come into contact with the second conducting surface, and thereby define an active connection.

Also, the resistance wire is disposed and structured to transfer heat to at least the primary insulator upon establishment of the active connection.

It should be appreciated that various embodiments of the present invention may comprise various configurations of the elongated resistance wire. As a non-limiting example, the elongated resistance wire may comprise a spiral configuration extending along and at least partially surrounding the primary insulator. In a preferred embodiment, the resistance wire extends along a majority of the length of the primary insulator. Further, the resistance wire may be partially enclosed within the primary insulator in heat transferring relation thereto.

Additionally, a preferred embodiment comprises a secondary insulator disposed in covering, insulating relation to at least a portion of the resistance wire.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 4 is a cross-sectional view of an illustrative embodiment of an extension cord in accordance with the present invention.

FIG. 5 is a cross-sectional view of another illustrative embodiment of an extension cord in accordance with the present invention.

FIG. 6 is a cross-sectional view of yet another illustrative embodiment of an extension cord in accordance with the present invention.

Like reference numerals refer to like parts throughout the several views of the drawings.

DETAILED DESCRIPTION OF THE PREFERRED EMBODIMENT

Figure 1:
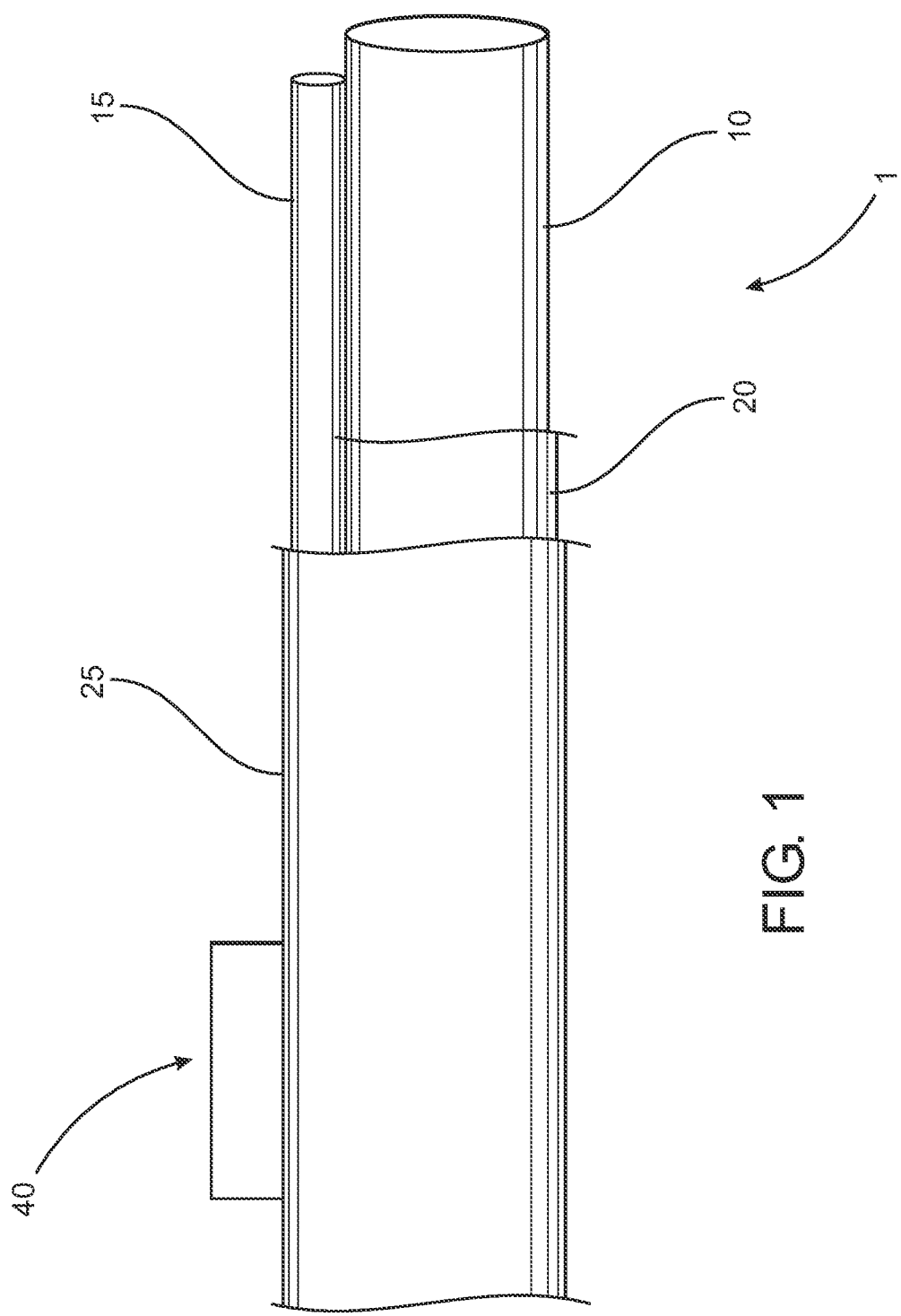
FIG. 1 is a perspective view in partial cutaway of an illustrative embodiment of an extension cord in accordance with the present invention.

As represented in the accompanying drawings, the present invention is generally directed to an extension cord, indicated in FIG. 1 at 1. The extension cord 1 is structured to connect a power source, shown at 50 in FIG. 3, to a power take-off (not shown). A power source may be, by way of example, a standard power outlet configured to provide 110 volts, 120 volts, or any other desired or standardized voltage.

With further reference to FIG. 1, the extension cord 1 comprises a primary conductor 10 extending along a length of the extension cord 1 between opposite ends thereof. The primary conductor 10 may be structured for conducting power, electricity, etc. in the form of alternating and/or direct current. Accordingly, the primary conductor 10 comprises a material of construction suitable for conducting current, i.e. electrical power from the power source 50 to the power take-off.

The extension cord 1 further comprises at least one primary insulator 20 secured in a surrounding relation to the primary conductor 10. The primary insulator 20 extends along at least a portion of the length of the primary conductor 10. The primary insulator 20 comprises a thermally insulating material of construction. The primary insulator 20 also comprises a material suitably electrically insulating to prevent a "short circuit" between the primary conductor 10 and the resistance wire 15.

Additionally, at least one elongated resistance wire 15 is connected to and extends along at least a majority of the length of the primary insulator 20. Thus, alternative embodiments of an extension cord 15 consistent with the present invention may comprise a plurality of elongated resistance wires 15. The resistance wire 15 in the embodiment of FIG. 1 is structured such that passage of current therethrough, such as through establishing an "active connection" of the resistance wire 15 in current receiving relation to the power source 50, causes the resistance wire 15 to heat up. The resistance wire 15 is disposed and structured to transfer the heat generated by the passage of current therethrough to at least the primary insulator 20, thereby heating the primary conductor 10.

Figure 2:
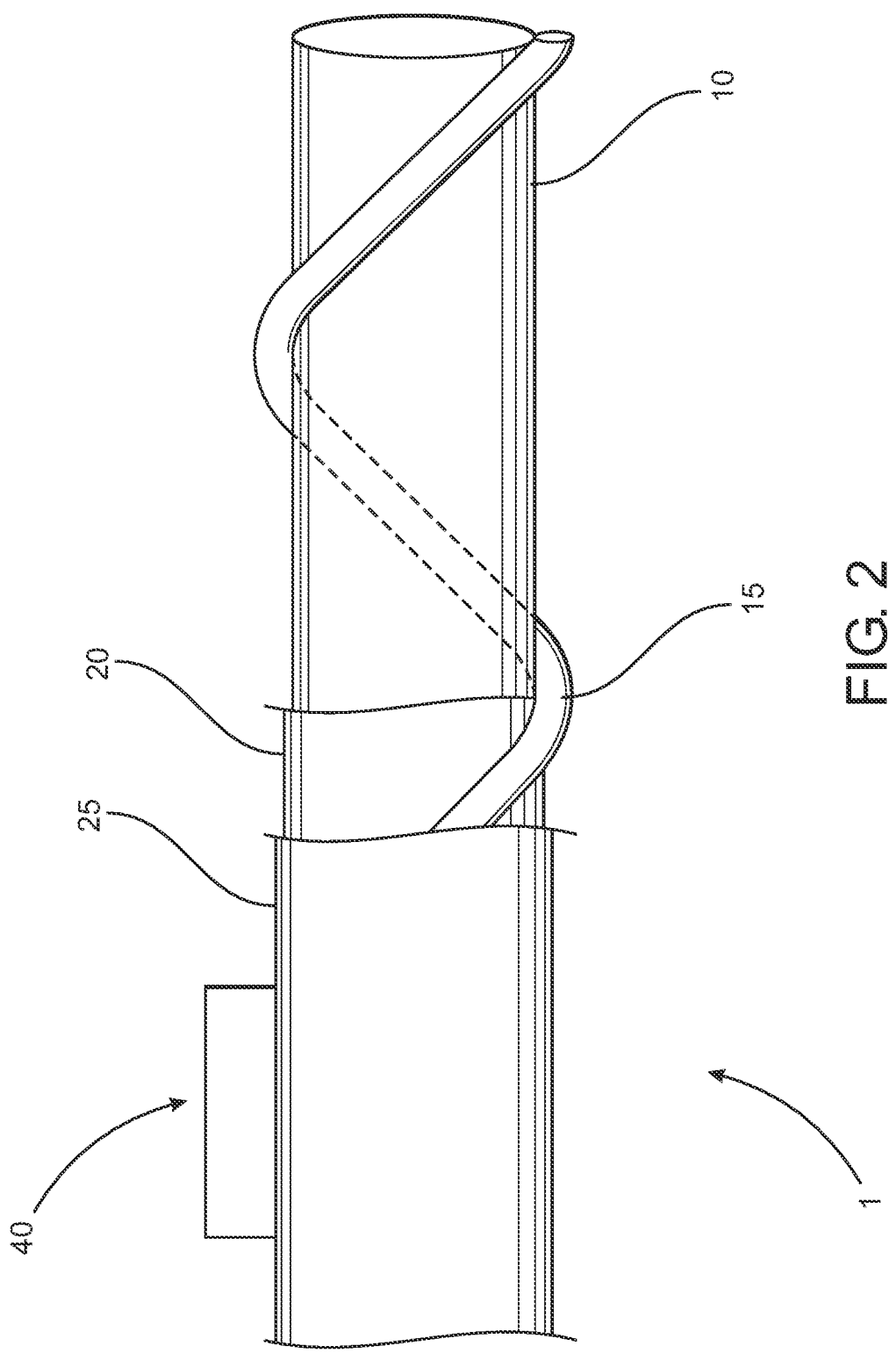
FIG. 2 is a perspective view in partial cutaway of another illustrative embodiment of an extension cord in accordance with the present invention.

In an embodiment in accordance with that shown in FIG. 2, the resistance wire 15 comprises an elongated, spiral configuration extending along and at least partially surrounding a length of the primary insulator 20. Though only one resistance wire 15 is shown in FIG. 2, alternate preferred embodiments of an extension cord 1 consistent with the present invention may comprise a plurality of resistance wires in such a spiral configuration. With additional reference to FIG. 2, the spiral configuration of the resistance wire 15 may facilitate a more thorough and/or rapid heating of the primary insulator 20, and by extension the primary conductor 10.

With reference to FIGS. 4-6, cross sectional views of various embodiments of an extension cord 1 are provided. In each view, the resistance wire 15 is disposed in surrounding relation to at least a portion of the length of the primary insulator 20. It should be appreciated that, because these Figures are cross sectional views, the resistance wire 15 may be in, for example, an elongated and/or an elongated, spiral configuration or another configuration consistent with the depictions. Further, in the embodiments of FIGS. 4-6, the resistance wire 15 is connected to an outer surface of the primary insulator 20. In FIGS. 5 and 6, the resistance wire 15 is partially enclosed within the primary insulator 20. It should be further appreciated that in at least one embodiment of an extension cord 1, the resistance wire 15 is connected to an outer surface of the primary insulator 20 and protrudes outwardly therefrom.

Returning to the embodiments as shown in FIGS. 1 and 2, the extension cord 1 further comprises a secondary insulator 25. The secondary insulator 25 is disposed in a covering relation to at least a portion of the resistance wire 15. Additionally, the secondary insulator 25 further facilitates insulation of the extension cord 1 by trapping heat produced by the resistance wire 15, hindering its passage into the environment. Thereby, the heat produced by the resistance wire 15 is more efficiently harnessed to heat the primary insulator 20, which may in turn facilitate flow of heat to the primary conductor 10. By way of example, the secondary insulator 25 may comprise a rubber and/or plastic material of construction.

The secondary insulator 25 is further secured to the outer surface of the primary insulator 20, so as to retain the resistance wire, thus defining a retaining relation relative to the resistance wire 15. Securing the secondary insulator 25 to the primary insulator 20 may be accomplished by any suitable method, including but not limited to an adhesive applied to a surface of the secondary insulator 25 suitable for adhesion to the primary insulator 20. Accordingly, the secondary insulator 25 comprises an adhesive portion, indicated at 26 in FIGS. 4-6, secured to an outer surface of the primary insulator 20.

Figure 3:
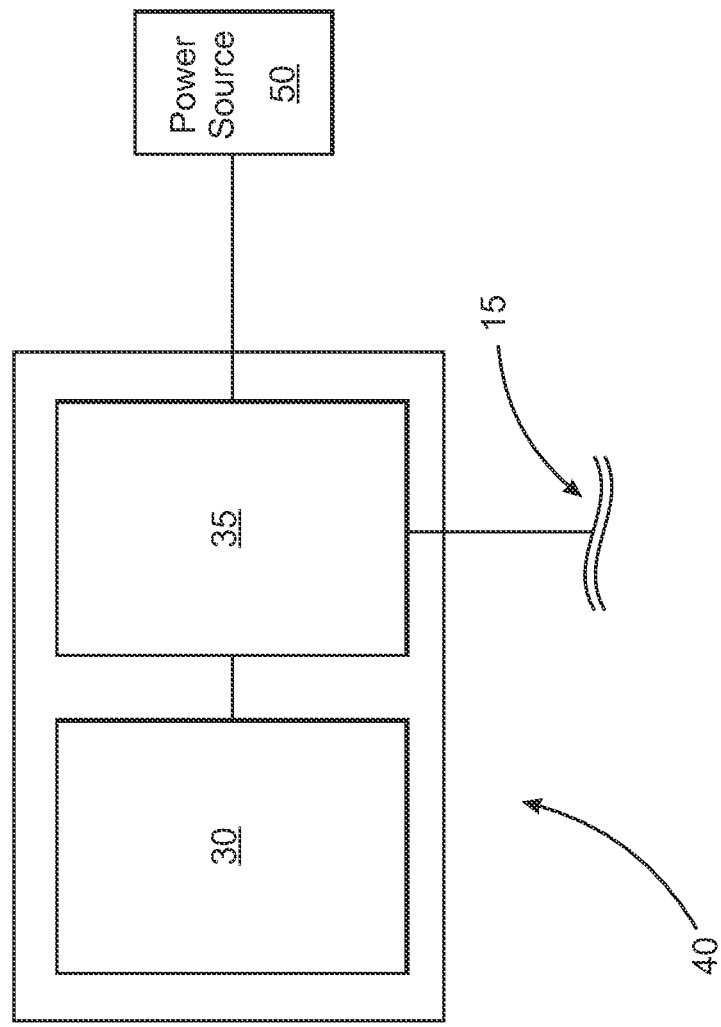
FIG. 3 is a schematic representation of various components of an extension cord in accordance with the present invention.

With additional reference to FIGS. 1 and 2, depicted embodiments of the extension cord 1 comprise a thermostat 40 structured for determination of a temperature exterior to at least the primary insulator 20. FIG. 3 shows an embodiment of a thermostat 40. Accordingly, a switching structure 35 and a temperature sensor 30 are connected to one another.

With further reference to FIG. 3, the switching structure 35 is additionally connected to at least the at least one resistance wire 15 and the power source 50. Accordingly, the switching structure 35 is structured to facilitate the active connection of the resistance wire 15 in current receiving relation to the power source 50. In other words, activation of the switching structure 35 allows the flow of current from the power source 50 to the resistance wire 15, which as detailed above facilitates heating by the resistance wire 15. Similarly, deactivating the switching structure 35 removes, or "breaks," the flow of current to the resistance wire 15.

The temperature sensor 30 is operative for determination of an ambient temperature exterior to at least the primary insulator, as discussed above and indicated at 20 in FIGS. 1, 2 and 4-6. With further reference to FIG. 3, a predetermined temperature is established, such as by the user. It may be desirably that the predetermined temperature be a cold temperature below which the operation of the extension cord 1 may be impacted. Accordingly, it may be desirable, such as by the user, that the extension cord 1 remain heated above such predetermined temperature. The temperature sensor 30 and switching structure 35 are operative so as to establish the above described active connection upon determination of the predetermined ambient temperature. Setting of the predetermined temperature may be accomplished by any suitable method, such as providing a user with a dial representing ranges of temperatures from which to select. The dial may further be structured to deactivate the extension cord 1 entirely.

A further implementation of an embodiment of an extension cord 1 or plurality thereof as disclosed herein is to facilitate heating of an area of the ground or other surface, such as a portion of concrete at a work area. Further, the extension cord 1 or plurality thereof may be covered by an insulator, such as a tarp, to facilitate and distribute to the area the heat produced.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. An extension cord structured to connect an electrical power source to a power take-off, said extension cord comprising:
   a primary conductor extending along a length of the extension cord between opposite ends thereof,
   a primary insulator secured in surrounding relation to said primary conductor and extending along a length thereof,
   at least one elongated resistance wire connected to said primary insulator and extending along at least a majority of a length of said primary insulator,
   a secondary insulator disposed in covering, insulating relation to at least a portion of said at least one elongated resistance wire,
   a switching structure connected to said at least one elongated resistance wire and structured to define an active connection of said resistance wire in current receiving relation to the power source,
   a temperature sensor disposed and structured to sense ambient temperature exteriorly of said primary insulator, said temperature sensor connected to said switching structure and operative therewith to establish said active connection on determination of a predetermined ambient temperature,
   said at least one elongated resistance wire disposed and structured to transfer heat to at least said primary insulator upon establishment of said active connection, and
   said at least one elongated resistance wire at least partially enclosed within said primary insulator in heat transferring relation thereto,
   wherein said at least one elongated resistance wire is indented into and forms a depression in both the primary insulator and the primary conductor along the length of said at least one elongated resistance wire.

2. An extension cord as recited in claim 1 wherein said at least one elongated resistance wire comprises an elongated, spiral configuration extending along and at least partially surrounding a length of said primary insulator.

3. An extension cord as recited in claim 2, said spiral configuration extending continuously along at and least partially surrounding a majority of the length of said primary insulator.

4. An extension cord as recited in claim 1 wherein said at least one elongated resistance wire comprises an elongated configuration extending along at least a majority of the length of said primary insulator.

5. An extension cord as recited in claim 1 wherein said at least one elongated resistance wire comprises an elongated, spiral configuration extending continuously along and at least partially surrounding at least a majority of the length of said primary insulator.

6. An extension cord as recited in claim 1 wherein said at least one elongated resistance wire is connected to said primary insulator adjacent to an outer surface of said primary insulator.

7. An extension cord as recited in claim 1 wherein said at least one elongated resistance wire is connected to an outer surface of said primary insulator in at least partially, outwardly protruding relation thereto.

8. An extension cord as recited in claim 1 wherein said secondary insulator is secured to said outer surface of said primary insulator.

9. An extension cord as recited in claim 8 wherein said secondary insulator is secured to said primary insulator in retaining relation to said one resistance wire.

10. An extension cord as recited in claim 1 further comprising said secondary insulator connected to an exterior of said primary insulator in retaining relation to said resistance wire.

11. An extension cord as recited in claim 10 wherein said secondary insulator comprises an adhesive portion disposed in adhesively secured relation to an outer surface of said primary insulator.

12. An extension cord as recited in claim 11 wherein said at least one elongated resistance wire is mounted on said secondary insulator in secured relation to said primary insulator.

13. An extension cord as recited in claim 1 wherein said temperature sensor and said switching structure are cooperatively structured to collectively define a thermostat.

14. An extension cord structured to electrically connect an electrical power source to a power take-off, said extension cord comprising:
   a primary conductor having an elongated configuration,
   a primary insulator secured in surrounding relation to said primary conductor and extending along the length thereof,
   at least one elongated resistance wire connected to said primary insulator and extending along at least a majority of the length of said primary insulator,
   a secondary insulator disposed in covering, insulating relation to at least a portion of said at least one elongated resistance wire,
   an adhesive portion disposed between an outer surface of said primary insulator and an inner surface of said secondary insulator in interconnecting relation between said primary insulator and said secondary insulator,
   a thermostat connected to said at least one elongated resistance wire and disposed and structured to determine exterior ambient temperature,
   said thermostat operative to make and break an active connection between said at least one elongated resistance wire and the power source,
   said at least one elongated resistance wire disposed and structured to transfer heat to at least said primary insulator upon establishment of said active connection,
   said secondary insulator disposed and structured to restrict heat transfer from said at least one elongated resistance wire to an exterior of said secondary insulator, and
   said at least one elongated resistance wire at least partially enclosed within said primary insulator in heat transferring relation thereto.

15. An extension cord as recited in claim 14 wherein said at least one elongated resistance wire comprises an elongated spiral configuration extending along at least a majority of a length of said primary insulator.

16. An extension cord as recited in claim 15 wherein said spiral configuration extends continuously along and in substantially surrounding relation to a majority of said primary insulator.

17. An extension cord as recited in claim 14 wherein said at least one elongated resistance wire is connected to said primary insulator adjacent an outer surface of said primary insulator.

18. An extension cord as recited in claim 17 a wherein said secondary insulator is disposed in covering, insulating relation to at least a portion of said at least one elongated resistance wire extending outwardly from said primary insulator.

\* \* \* \* \*